March 14, 1961     J. T. PITTS     2,974,870
ATMOSPHERIC CONDENSATION PREVENTION CONTROL APPARATUS
Filed Aug. 15, 1957
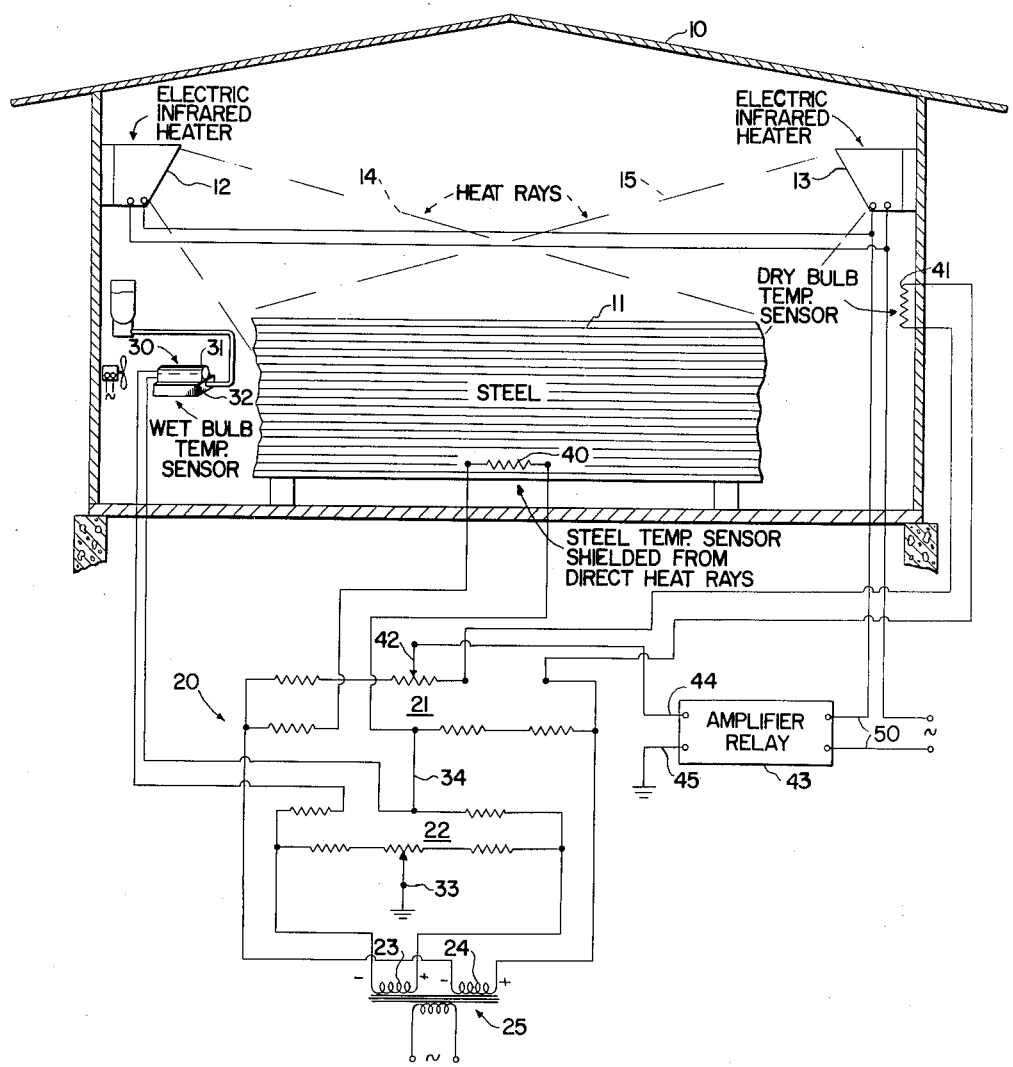
INVENTOR.
JOHNSTON T. PITTS
BY
*Joseph E. Ryan*
ATTORNEY United States Patent Office 2,974,870
Patented Mar. 14, 1961

2,974,870
ATMOSPHERIC CONDENSATION PREVENTION CONTROL APPARATUS

Johnston Thomas Pitts, Houston, Tex., assignor to Minneapolis-Honeywell Regulator Company, Minneapolis, Minn., a corporation of Delaware Filed Aug. 15, 1957, Ser. No. 678,274
3 Claims. (Cl. 236—44)

The present invention is concerned with a temperature control system for controlling the temperautre of goods in a warehouse, in particular, the temperature of the stored goods is maintained above the dew point temperature. The heating load of the storage space is maintained at a minimum and yet the temperature of the goods is high enough so that moisture does not condense on the stored material.

In large warehouses particularly steel storage warehouses, where due to their construction, the heating load increases rapidly as the ambient temperature in the warehouse is maintained higher than the outdoor temperature. In order to prevent condensation on steel which is not protected for the prevention of rust it is often necessary to maintain the ambient temperature in such warehouses above the dew point temperature to prevent condensation of moisture on the steel. As the relative humidity or amount of moisture in the air varies from day to day the control point of the dry bulb temperature controller by necessity must be maintained at the highest temperature which will always be above the dew point temperature for the high humidity periods. This maintained dry bulb temperature is often quite high resulting in a greater heating load for these uninsulated steel warehouses.

The present invention is concerned with an improved temperature control system which maintains the steel or stored material temperature slightly above the dew point temperature. Thus on periods of low humidity the dry bulb temperature in the warehouse is quite low to keep the heating load at a minimum. On the occasion of a high humidity, the steel temperature is raised above the dew point temperature to prevent the condensation of moisture on the steel and thus protecting it from rust.

It is therefore an object of the present invention to provide an improved temperature control system.

Another object of the present invention is to provide an improved temperature control system for preventing the condensation of moisture on stored goods in a warehouse.

And still another object of the present invention is to provide an improved control system in which the temperature of stored goods in a warehouse is reset by the relative humidity in the warehouse to keep the temperature of the stored goods above the dew point temperature at all times.

These and other objects will become apparent upon a study of the following specification and drawing of which a single figure is a schematic representation of one particular type of insulation wherein steel is stored in a warehouse and is heated by infrared heaters. The control of the heaters is by a sensor responsive to the steel temperature. The control point of the temperature sensor is reset by the relative humidity in the warehouse.

Referring to the single figure, a typical warehouse 10 is shown having goods stored therein such as steel 11. The warehouse of a conventional type might be poorly insulated and heat is generally furnished by means of unit heaters 12 and 13. These heaters are electric infrared heaters in this particular application wherein the heat rays 14 and 15 from the respective heaters are directed toward the stored steel so that a high percentage of the heat from the heaters is concentrated on the steel. This type of heat has its advantage in that the transfer of heat from the heater to the steel is direct which is not the case in all unit heaters; however, the type of heaters is of no consequence as far as the scope of the present invention is concerned.

A network circuit 20 of a conventional type comprises two bridges 21 and 22 each of which is connected to a respective secondary 23 and 24 of a transformer 25. Connected in one leg of bridge 22 is a temperature responsive resistance element 30 responsive to the wet bulb temperature in warehouse 10. This wet bulb sensor is a conventional type having a rag 31 wrapped around the element and hung in a pan 32 containing water so that as air is forced over the element by means of a fan evaporation takes place. Element 30 is maintained at the wet bulb temperature.

The output of bridge 22 exists between a grounded terminal 33 and a second terminal 34 which is connected to bridge 21. The bridge 22 is so made up that as the resistance of element 30 increases with the polarity of secondary 23 positive on the right side as shown, the output of bridge 22 at terminal 34 would be positive with respect to terminal 33.

Bridge 22 has a temperature responsive resistance element 40 connected in one leg. Element 40 is attached to a representative piece of stored steel and is shielded from the direct rays of the heaters 12 and 13. An opposite leg of bridge 21 contains a temperature responsive resistance element 41 which is responsive to the dry bulb temperature in warehouse 10. An output of bridge 21 which exists between terminals 34 and 42 depends upon the combined resistance of elements 40 and 41. As either increases in resistance upon the increase in the steel temperature or the dry bulb temperature, assuming a positive polarity on the right side of secondary 24, terminal 42 becomes negative with respect to terminal 34.

An amplifier relay 43 of a conventional type in which upon the increase in magnitude of the voltage to its input terminal 44 with respect to a grounded terminal 45 causes a relay to close shorting output terminals 50 which are connected to cause energization of heaters 12 and 13 by connecting them to a source of power. This amplifier relay might be of the type disclosed in the Albert P. Upton Patent No. 2,423,534, issued July 8, 1947. Output terminal 42 is connected to input terminal 44 of the amplifier relay thus the combined outputs of bridges 21 and 22 control the operation of the relay and the heat output of heaters 12 and 13.

Operation

Assuming that the dry bulb temperature as sensed by element 41 and the steel temperature as sensed by element 40 are the same as there has been no change in the relative humidity or moisture content of the air in the warehouse 10. The bridge circuits are so calibrated by conventional means so that the temperature of the steel in the warehouse is slightly above the dew point temperature. The differential between the dew point temperature and the steel temperature of course is selected depending upon the particular installation and a number of factors primarily the response of the heating system to a change in humidity conditions. With a slow response thus a lag in the temperature control system it is obviously necessary to increase the differential between the maintained steel temperature and the dew point temperature so that at no time will the steel temperature get near or below the dew point temperature.

Assuming that the moisture content of the air in the warehouse increased. This moisture content would be immediately sensed by the wet bulb responsive element 30 and would change the output of bridge 22 to energize relay 43 to initiate operation of heaters 12 and 13. As the heat rays which are directed on the steel increases the steel temperature and the resistance of element 40, the output of bridge 21 which is of the opposite phase would eventually cancel out the output of bridge 22 due to the increase in the resistance of element 30. This would shut down the heaters. Assuming that there was a considerable lag between the dry bulb temperature and the steel temperature. It is obvious that the steel temperature might be increased above that which would be necessary to maintain it above the dew point temperature. As the dry bulb temperature increased to that of the steel temperature the resistance of element 41 would increase to modify the output of bridge 21 in the same direction as did the increase in resistance of element 40. This would result in a slight decrease in the steel temperature as the system stabilized at the new steel temperature established by the higher moisture content of the air in the warehouse.

Referring to a psychrometric chart let us assume that the moisture content—grains of water per pound of dry air—is 50. At this moisture content the dew point temperature is 48° thus it is obvious that if we keep the steel temperature slightly above 48° no moisture will condense on the steel. It is necessary to maintain a differential betweeen the steel temperature and the dew point temperature and for explanation purposes let us assume that this differential was approximately 6°. This would mean that we should maintain the steel temperature at 54° and upon the stabilizing out of the temperature in the warehouse the dry bulb temperature at 54° would indicate that the relative humidity was 80%.

Let us further assume that the moisture content in the warehouse increased to 80 grains of water per pound of dry air. This would increase the dew point to 61°. Immediately the wet bulb sensor 30 would increase in resistance and start operation of heaters 12 and 13. The heaters would remain energized until the steel temperature raised above 61° and eventually the system would stabilize out with a dry bulb temperature approximately 66° where the dry bulb temperature line intersected the 80% relative humidity for the new moisture content.

In a temperature control system which keeps the dry bulb temperature and the steel temperature as low as possible and yet above the dew point temperature the heating load of the space is then maintained at a minimum. This is quite important as the heating load rises rapidly as the differential between the indoor and outdoor temperature increases.

As the invention has been described for one typical installation other modifications would be obvious to one skilled in the art, therefore, it is intended that the scope of the present invention only be limited by the appended claims.

I claim:
1. In a control system for controlling an infrared heat source in a steel storage warehouse to maintain the temperature of the steel high enough to prevent condensation of moisture thereon, a network circuit made up of two bridge circuits each having a source of power and an output circuit, a first temperature responsive element responsive to the wet bulb temperature in the warehouse, means connecting said first element as one leg of a first of said bridge circuits, a second temperature responsive element responsive to the stored steel temperature, a third temperature responsive element responsive to the dry bulb temperature in the warehouse, means connecting said second and third elements in opposite legs of said second bridge circuit, said first element having the opposite effect upon the output of said first bridge as either said second or said third elements have on the output of said second bridge, amplifier relay means, means connecting the output of said bridges in series to the input of said amplifier means, means connecting said relay means in controlling relation to the heat source whereby the steel temperature is maintained at a dry bulb temperature above the dew point temperature so that moisture does not condense on the stored steel and the heating load is maintained at a minimum.

2. In a control system for controlling a heat source in a warehouse to maintain the temperature of the stored goods above the dew point temperature, first temperature responsive means responsive to the temperature of the stored goods, relay means adapted to control the heat source, circuit means connecting said first temperature responsive means in a manner to control said relay means to maintain the temperature of the stored goods at a selected temperature, second temperature responsive means responsive to the dry bulb temperature in the warehouse, third temperature responsive means responsive to the wet bulb temperature in the warehouse, and circuit connection means including said first mentioned circuit means for connecting said second and third temperature responsive means in a manner to modify the effect of said first temperature responsive means on said relay means thereby resetting the temperature of the steel goods depending upon the combined outputs of the dry and wet bulb temperature responsive means.

3. In a control system for maintaining the temperature of stored goods above the dew point temperature to prevent condensation of moisture on the goods and keep the dry bulb temperature at a minimum, first temperature responsive means mounted in thermal relation to the stored goods and thus being responsive to the temperature of the stored goods, relay means, heating means adapted to heat the stored goods, first connection means connecting said first temperature responsive means, said relay means and said heating means in the order named so that the temperature of the stored goods is maintained at a selected temperature, dry bulb temperature responsive means, wet bulb temperature responsive means, means connecting said dry bulb and wet bulb temperature responsive means to provide an output indicative of relative humidity, and means connecting said output to said first mentioned connection means to reset the maintained stored goods temperature depending upon the relative humidity so that the temperature of the stored goods is always a predetermined amount above the dew point temperature.

References Cited in the file of this patent
UNITED STATES PATENTS

| | | |
|---|---|---|
| 1,276,589 | Steinmetz | Aug. 20, 1918 |
| 1,459,391 | Clausen | June 19, 1923 |
| 1,758,494 | Behr | May 13, 1930 |
| 2,136,559 | Miller | Nov. 15, 1938 |
| 2,394,061 | Horstkotte | Feb. 5, 1946 |
| 2,527,115 | Bosworth | Oct. 24, 1950 |
| 2,647,374 | Stoner | Aug. 4, 1953 |

OTHER REFERENCES
Steel, for November 17, 1952, page 126.